United States Patent
Lee et al.

(10) Patent No.: US 10,052,591 B2
(45) Date of Patent: Aug. 21, 2018

(54) SYSTEM AND METHOD FOR FILTRATION

(75) Inventors: Kwang-Jin Lee, Yongin-si (KR); Ah Reum Lee, Yongin-si (KR); Yong-Cheol Shin, Seoul (KR); Joon Yul Yang, Anyang-si (KR)

(73) Assignees: KOLON INDUSTRIES, INC., Gwacheon-si (KR); KOLON ENVIRONMENTAL SERVICE CO., LTD., Gwacheon-si (KR)

( * ) Notice: Subject to any disclaimer, the term of this patent is extended or adjusted under 35 U.S.C. 154(b) by 603 days.

(21) Appl. No.: 13/876,334

(22) PCT Filed: Sep. 27, 2011

(86) PCT No.: PCT/KR2011/007076
§ 371 (c)(1),
(2), (4) Date: Apr. 12, 2013

(87) PCT Pub. No.: WO2012/044028
PCT Pub. Date: Apr. 5, 2012

(65) Prior Publication Data
US 2013/0213886 A1    Aug. 22, 2013

(30) Foreign Application Priority Data
Sep. 28, 2010    (KR) .................. 10-2010-0093629

(51) Int. Cl.
*B01D 65/08*    (2006.01)
*B01D 65/02*    (2006.01)

(52) U.S. Cl.
CPC ............. *B01D 65/02* (2013.01); *B01D 65/08* (2013.01); *B01D 2313/26* (2013.01); *B01D 2315/06* (2013.01); *B01D 2321/185* (2013.01)

(58) Field of Classification Search
CPC .. B01D 63/024; B01D 65/02; B01D 2313/26; B01D 2315/06; B01D 2321/185; C02F 3/1268; C02F 3/1273
See application file for complete search history.

(56) References Cited

U.S. PATENT DOCUMENTS

2002/0195390 A1* 12/2002 Zha et al. ................ 210/636
2003/0038075 A1*  2/2003 Akimoto et al. ....... 210/321.79
2003/0121852 A1   7/2003 Katsu et al.

FOREIGN PATENT DOCUMENTS

JP    7-185270 A    7/1995
JP    H07185270 A *  7/1995 ............. B01D 65/02
(Continued)

OTHER PUBLICATIONS

Braak, et al., "Aeration and hydrodynamics in submerged membrane bioreactors," J. Memb. Sci., vol. 379 (2011), 18 pages.*
(Continued)

*Primary Examiner* — Patrick J Orme
(74) *Attorney, Agent, or Firm* — Sughrue Mion, PLLC

(57) ABSTRACT

Disclosed are system and method for filtration which can minimize the contamination of the filtering membrane through a pretreatment and perform the pretreatment and the filtration with a filtering membrane in a single filtering unit so that any need for separate and additional space and facility for the pretreatment can be obviated. The system for filtration of the present invention comprises a fine bubble supplier for providing fine bubbles into the feed water. The pretreatment is performed by supplying the feed water to be treated into the filtering unit through a dynamic filtration layer which is formed in the filtering unit as the fine bubbles rise.

3 Claims, 2 Drawing Sheets

(56) References Cited

FOREIGN PATENT DOCUMENTS

| JP | 9-99225 A | 4/1997 | | |
|---|---|---|---|---|
| JP | 10-165778 A | 6/1998 | | |
| JP | H10165778 | * 10/1998 | ............ | B01D 63/04 |
| JP | 11-319494 A | 11/1999 | | |
| JP | 2002-113333 A | 4/2002 | | |
| JP | 2004-174302 A | 6/2004 | | |
| JP | 2004174302 | * 6/2004 | ............ | B01D 65/00 |

OTHER PUBLICATIONS

JP2004174302—EPO Machine Translation (2015), 11 pages.*
JPH07185270—EPO Machine Translation (2015), 7 pages.*
JPH10165778—EPO Machine Translation (2015), 11 pages.*
JP2004174302—USPTO Human Translation (2015), 19 pages.*
JPH10165778—USPTO Human Translation (2015), 15 pages.*
JP1995185270A—USPTO Human Translation (2015), 9 pages.*
Shyu, et al., Chemical Engineering Research and Design, May 2002, 355-363 (10 pages).*
International Searching Authority, International Search Report of PCT/KR2011/007076, dated May 1, 2012.
Korean Intellectual Property Office; Communication dated Jan. 13, 2017, in corresponding Korean Application No. 10-2011-0097253.

* cited by examiner

SYSTEM AND METHOD FOR FILTRATION

TECHNICAL FIELD

The present invention relates to system and method for filtration, and more particularly, to system and method for filtration which can obviate any need for separate and additional space and facility for pretreatment, prevent the contamination of a filtering membrane, and effectively clean the contaminated filtering membrane.

BACKGROUND ART

A separation method using a filtering membrane has a lot of advantages over a method for separation through heating or phase-change. One of the advantages is the high reliability of the process which can be achieved by controlling the size of the fine pores of the filtering membrane so as to stably obtain the water of desired quality. Furthermore, since the filtering membrane does not require a heating process, it can be advantageously used for water treatment using microorganisms that could be adversely affected by heat.

As the filtration process is performed by the filtering membrane, however, the impurities are likely to cause the contamination of the filtering membrane thereby reducing the permeability thereof.

Although the cleaning of the filtering membrane such as backwashing, aeration and the like can be carried out to solve the problem of the filtering membrane contamination, such cleaning has a limitation in that it removes the impurities from the filtering membrane which has been already contaminated and thus functions only as an action after accident.

Thus, to radically minimize the contamination of the filtering membrane, it is conceivable to perform a pretreatment as an advance action to remove relatively large solid materials from the feed water before the filtration by the filtering membrane.

The pretreatment is problematic, however, because it requires a separate and additional space and facility therefore and thus increases the filtration cost.

DISCLOSURE

Technical Problem

Therefore, the present invention is directed to system and method for filtration capable of preventing these limitations and drawbacks of the related art.

An aspect of the present invention is to provide system and method for filtration which can minimize the contamination of the filtering membrane through a pretreatment and perform the pretreatment and the filtration with a filtering membrane in a single filtering unit so that any need for separate and additional space and facility for the pretreatment can be obviated.

Another aspect of the present invention is to provide a system for filtration which can maximize the exploitation of the fine bubbles supplied for aeration cleaning of the hollow fiber membrane in the module case.

Still another aspect of the present invention is to provide system and method for filtration which can not only prevent the filtering membrane contamination itself but also clean the contaminated filtering membrane effectively.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof.

Technical Solution

In accordance with the one aspect of the present invention, there is provided a system for filtration comprising a filtering unit providing a space for a feed water to be treated, a fine bubble supplier providing the feed water with fine bubbles, a filtering membrane, the fine bubbles being supposed to touch the filtering membrane when rising within the feed water, and a feed water supplier providing the filtering unit with the feed water through a dynamic filtration layer, the dynamic filtration layer being formed in the filtering unit as the fine bubbles rise.

In accordance with another aspect of the present invention, there is provided a system for filtration comprising a module case comprising a feed water inlet port, a fine bubble inlet port, and a filtrate outlet port, a feed water supplier providing a feed water to be treated into the module case through the feed water inlet port, a fine bubble supplier providing fine bubbles into the feed water in the module case through the fine bubble inlet port, a fixing member in the module case, the fixing member physically blocking the filtrate outlet port from a space for the feed water so that the feed water is prevented from discharging from the module case through the filtrate outlet port, a hollow fiber membrane in the module case, wherein both ends of the hollow fiber membrane are potted in the fixing member and are open so that the hollow fiber membrane is in fluid communication with the filtrate outlet port, and a pump for applying a negative pressure to a lumen of the hollow fiber membrane through the filtrate outlet port.

In accordance with still another aspect of the present invention, there is provided a method for filtration comprising pre-treating a feed water to be treated and filtering the pre-treated feed water with a filtering membrane, wherein the pre-treating and filtering are performed in a single filtering unit.

The general description provided above and the detailed description provided below are provided only for illustration of the present invention and be construed as providing a more detailed description of inventions defined in claims.

Advantageous Effect

According to the present invention, the contamination of the filtering membrane can be minimized by the pretreatment. At the same time, the pretreatment and the filtration with a filtering membrane are performed in a single filtering unit so that any need for separate and additional space and facility for the pretreatment can be obviated.

Further, since not only the contamination of the filtering membrane can be economically and effectively prevented but also the cleaning accompanying the sterilization effect can be performed on the once contaminated filtering membrane, the system and method for filtration of the present invention can improve the filtration capacity of the filtering membrane and extend both backwashing cycle and recovery cleaning cycle.

Other advantages of the present invention will be described below in detail together with the related technical features.

DESCRIPTION OF DRAWINGS

The above and other objects, features and other advantages of the present invention will be more clearly understood from the following detailed description taken in conjunction with the accompanying drawings, in which.

MODE FOR INVENTION

Those skilled in the art will appreciate that various modifications, additions and substitutions are possible, without departing from the scope and spirit of the invention. Accordingly, the present invention includes all alternations and modifications that fall within the scope of inventions described in claims and equivalents thereto.

The term "normal bubble" as used herein is defined as a bubble having a diameter more than 100 μm. The normal bubble rises in the water at relatively high speed, bursts at the water surface, and finally disappears.

The term "fine bubble" as used herein is defined as a bubble having a diameter of 100 μm or less. The fine bubble may be classified into a microbubble having a diameter of 1 to 100 μm and a nanobubble having a diameter less than 1 μm. The microbubble rises in the water at relatively low speed, and as such, disappears slowly. The nanobubble can stay in the water for a few months.

Hereinafter, the systems and methods for filtration according to the embodiments of the present invention will be described in detail with reference to the annexed drawings.

Figure 1:
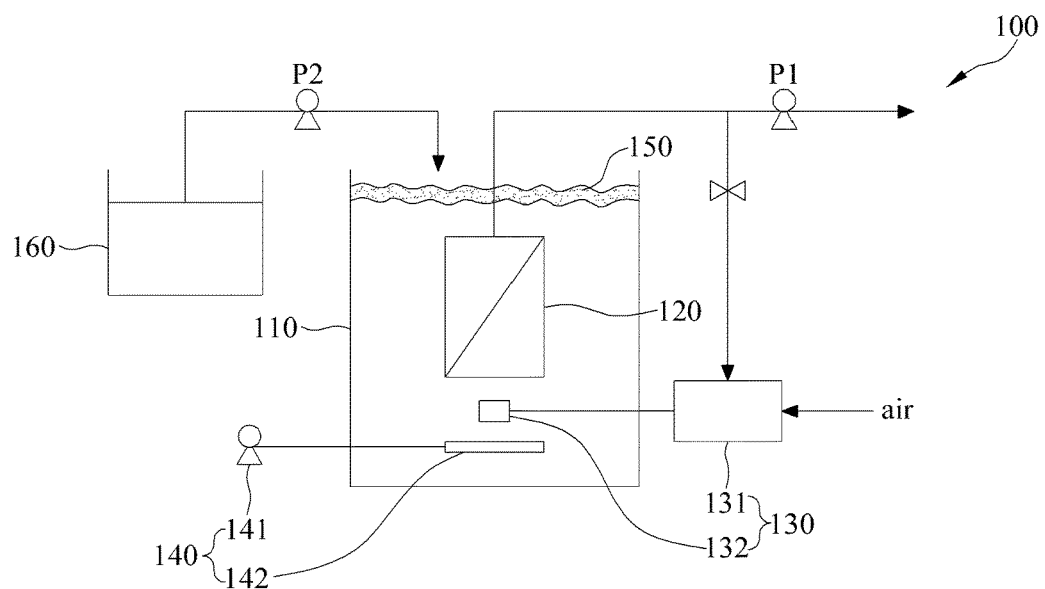
FIG. 1 schematically shows a system for filtration according to the first embodiment of the present invention.

FIG. 1 schematically shows a system for filtration according to the first embodiment of the present invention.

As illustrated in FIG. 1, the system 100 for filtration of the first embodiment of the present invention comprises a filtering unit 110 providing a space for a feed water to be treated. The filtering unit 110 may be a water bath.

A filtering membrane 120 is submerged into the fee water in the filtering unit 110. The filtering membrane 120 may be a hollow fiber membrane or a flat sheet membrane. A negative pressure from the first pump P1 is applied inside the filtering membrane 120 so that only fluid permeates the filtering membrane 120 and the solid components such as impurities and sludge are separated therefrom. In other words, the negative pressure from the first pump P1 is applied to the filtering membrane 120 so as to produce a filtrate.

The filtration system 100 of the present invention comprises a fine bubble supplier 130 for providing fine bubbles into the feed water in the filtering unit 110.

The fine bubble supplier 130 of the present invention may comprise an air dissolving unit 131 which receives an air and a portion of the filtrate produced by the filtering membrane 120, and dissolves the air in the filtrate to produce an air-dissolved filtrate.

The fine bubble supplier 130 of the present invention may further comprise a nozzle 132 which receives the air-dissolved filtrate from the air dissolving unit 131 and ejects it to produce fine bubbles. As illustrated in FIG. 1, the nozzle 132 may be disposed inside the filtering unit 110 and under the filtering membrane 120.

Further, the filtration system 100 according to the first embodiment of the present invention may further comprises a normal bubble supplier 140. The normal bubble supplier 140 may comprise a blower 141 and an aeration tube 142 which receives an air from the blower 141 and produces normal bubbles. As illustrated in FIG. 1, the aeration tube 142 may be disposed inside the filtering unit 110 and under the nozzle 132.

The filtration system 100 of the present invention comprises a feed water supplier for providing the filtering unit 110 with a feed water. The feed water supplier may comprise a feed water tank 160 for storing the feed water, and the second pump P2 for conveying the feed water from the feed water tank 160 to the filtering unit 110.

Hereinafter, the filtration process of the filtration system of the first embodiment of the present invention will be described in detail.

First, the feed water in the feed water tank 160 is conveyed to the filtering unit 110 by the second pump P2.

The nozzle 132 ejects fine bubbles into the feed water in the filtering unit 110. The fine bubbles may be microbubbles, nanobubbles, or the mixture thereof.

The fine bubbles rise within the feed water slowly. At this time, the impurities in the feed water rise toward the water surface together with the fine bubbles due to the attraction force between the impurities and the fine bubbles as well as the surface tension of the fine bubbles. As a result, there is formed a dynamic filtration layer 150 comprising the fine bubbles and a variety of impurities on or near the surface of the feed water in the filtering unit 110.

As time goes by, new fine bubbles and impurities are added to the dynamic filtration layer 150 and the existing fine bubbles disappear. That is, the shape and size of the dynamic filtration layer 150 are continuously variable.

The higher the proportion of the nanobubbles in the fine bubbles is, the thicker and more stable the dynamic filtration layer 150 is.

According to the first embodiment of the present invention, as illustrated in FIG. 1, the normal bubbles from the aeration tube 142 under the nozzle 132 rise toward the water surface at relatively high speed. The rapid rise of the normal bubbles induces the fine bubbles, particularly nanobubbles, to rise.

Meanwhile, the first pump P1 supplies the negative pressure inside the filtering membrane 120 thereby producing a filtrate. A portion of the resulting filtrate flows to the air dissolving unit 131. The air dissolving unit 131 receives an air through another path, dissolves the air in the filtrate to produce an air-dissolved filtrate, and then supplies it to the nozzle 132.

When rising, the fine bubbles produced by the nozzle 132 may touch or adhere to the surface of the filtering membrane 120 thereby preventing other impurities from adhering thereto. Furthermore, sterilization effect can also be expected since, as time goes by, the fine bubbles, particularly nanobubbles, burst and cause the temperature to rise sharply. The cleaning and sterilization effects of the fine bubbles as described above make it possible to keep the filtration capacity of the filtering membrane 120 for longer time.

Meanwhile, when the feed water is conveyed from the feed water tank 160 to the filtering unit 110 by the second pump P2, it passes through the dynamic filtration layer 150. Since the fine bubbles having the contaminants such as particulate contaminants and colloidal materials on the surface thereof have zeta potential, they can interact with the contaminants in the feed water supplied by the feed water supplier thereby performing the first filtration, i.e., the pretreatment, of the feed water.

Since the pretreatment is performed by means of the system and method as described above, the contamination of the filtering membrane 120 can be minimized, and both of the pretreatment and the filtration with the filtering membrane 120 can be carried out in a single filtering unit 110.

Figure 2:
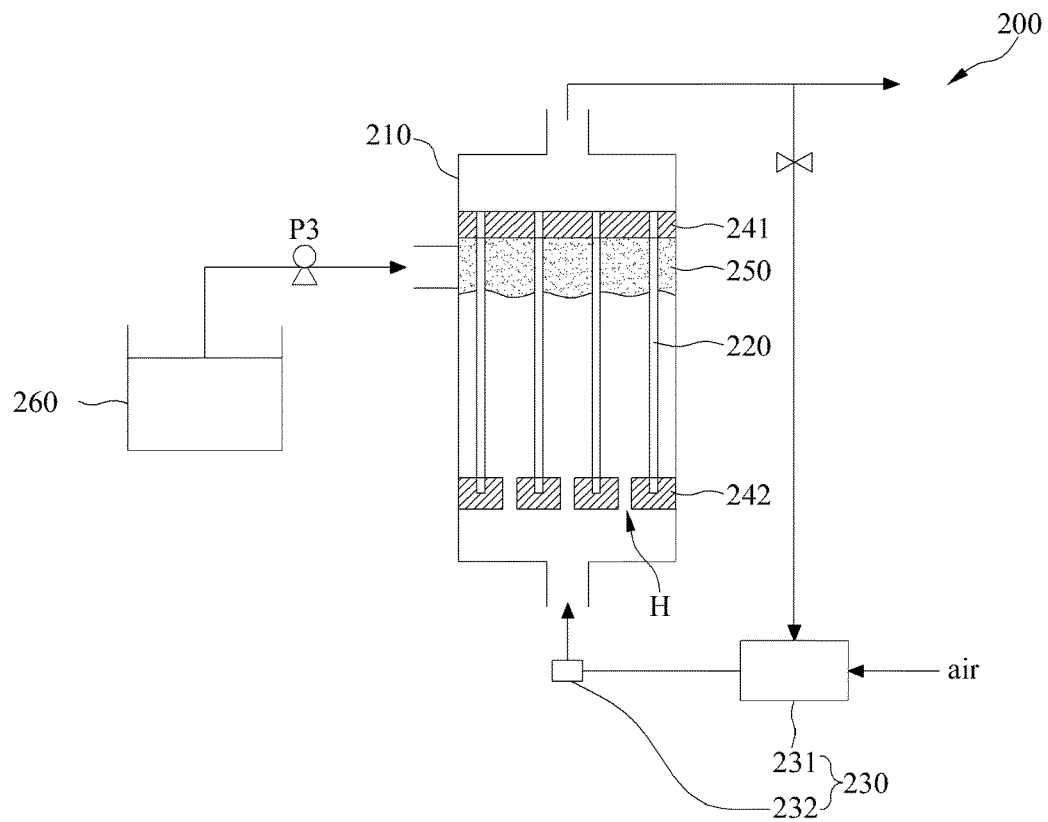
FIG. 2 schematically shows a system for filtration according to the second embodiment of the present invention.

FIG. 2 schematically shows a system for filtration according to the second embodiment of the present invention.

As illustrated in FIG. 2, the filtration system 200 according to the second embodiment of the present invention comprises a filtering unit 210 providing a space for a feed water to be treated. The filtering unit 210 may be a case for a hollow fiber membrane.

A filtering membrane 220 is fixed in the filtering unit 210 through the first and second fixing members 241 and 242. As illustrated in FIG. 2, the filtering membrane 220 may be a hollow fiber membrane. The second fixing member 242 at the lower portion of the filtering unit 210 has a plurality of holes H through which the feed water can pass.

The filtration system 200 comprises a feed water supplier for providing the filtering unit 210 with the feed water. The feed water supplier may comprise a feed water tank 260 for storing the feed water, and the third pump P3 for conveying the feed water from the feed water tank 260 to the filtering unit 210.

As the feed water pressurized by the third pump P3 is continuously supplied inside the filtering unit 210, only fluid permeates the filtering membrane 220 and the solid components such as impurities and sludge are separated therefrom. That is, as the feed water pressurized by the third pump P3 flows into the filtering unit 210, the fluid permeates the filtering membrane 220 to produce a filtrate.

The filtration system 200 according to the second embodiment of the present invention comprises a fine bubble supplier 230 for providing fine bubbles into the feed water in the filtering unit 210.

The fine bubble supplier 230 of the present invention may comprise an air dissolving unit 231 which receives an air and a portion of the filtrate produced by the filtering membrane 220, and dissolves the air in the filtrate to produce an air-dissolved filtrate.

The fine bubble supplier 230 may further comprise a nozzle 232 which receives the air-dissolved filtrate from the air dissolving unit 231 and ejects it to produce fine bubbles. As illustrated in FIG. 2, the nozzle 232 may be disposed outside the filtering unit 210 and the fine bubbles may be supplied to the feed water in the filtering unit 210 through a pipe.

Hereinafter, the filtration process of the filtration system 200 of the second embodiment of the present invention will be described in detail.

First, the feed water in the feed water tank 260 flows into the filtering unit 210 while pressurized by the third pump P3.

The fine bubbles from the fine bubble supplier 230 are provided into the feed water in the filtering unit 210. The fine bubbles may be microbubbles, nanobubbles, or the mixture thereof.

The fine bubbles pass through the holes H of the second fixing member 242 and rise slowly within the feed water. At this time, the impurities in the feed water rise toward the water surface together with the fine bubbles due to the attraction force therebetween. Consequently, there is formed a dynamic filtration layer 250 comprising the fine bubbles and a variety of particulate contaminants on the surface of the feed water, i.e., right under the first fixing member 241, in the filtering unit 210.

As time goes by, new fine bubbles and impurities are added to the dynamic filtration layer 250 and the existing fine bubbles disappear. Consequently, the shape and size of the dynamic filtration layer 250 are continuously changed during the filtration process.

A portion of the filtrate produced by the filtering membrane 220 flows into the air dissolving unit 231. The air dissolving unit 231 receives an air through another path, dissolves the air in the filtrate to produce an air-dissolved filtrate, and then supplies the air-dissolved filtrate to the nozzle 232.

The fine bubbles produced by the nozzle 232 are provided into the filtering unit 210 through the pipe. When rising within the feed water after passing through the holes H of the second fixing member 242, the fine bubbles may touch or adhere to the surface of the filtering membrane 220 thereby preventing other impurities from adhering thereto. Furthermore, sterilization effect can also be expected since, as time goes by, the fine bubbles, particularly nanobubbles, burst and cause the temperature to rise rapidly. The cleaning and sterilization effects of the fine bubbles as described above make it possible to keep the filtration capacity of the filtering membrane 220 for longer time.

When the feed water is conveyed from the feed water tank 260 to the filtering unit 210 by the third pump P3, it passes through the dynamic filtration layer 250. Since the fine bubbles with the contaminants such as particulate contaminants and colloidal materials attached thereto have zeta potential, they can interact with the contaminants in the feed water supplied by the feed water supplier thereby performing the first filtration, i.e., the pretreatment, of the feed water.

Since the pretreatment is performed by means of the system and method as described above, the contamination of the filtering membrane 220 can be minimized, and both of the pretreatment and the filtration with the filtering membrane 220 can be carried out in a single filtering unit 210.

Meanwhile, the filtration system 200 according to the second embodiment of the present invention may have such drawbacks as described below.

First, during the filtration process, new fine bubbles and impurities are continuously added to the dynamic filtration layer 250 and, at the same time, the fine bubbles which has been existing in the dynamic filtration layer 250 disappear as time goes by. The dissipation of the fine bubbles causes an air layer to be formed between the first fixing member 241 and the dynamic filtration layer 250 in the filtering unit 210.

The formation of the air layer causes a portion of the filtering membrane 220 to be exposed to the air. As the feed water of high pressure flows into the filtering unit 210, the pressure of the air layer also increases. Due to this, the portion of the filtering membrane 220 exposed to the air is penetrated by the air and the production of the filtrate by the filtering membrane 220 is obstructed.

The formation of the air layer can be prevented in some degree by applying a cross-flow type according to which, when the feed water flows into the filtering unit 210, the condensed water and air are discharged from the filtering unit 210 through an outlet port (not shown) at the same time. It is burdensome, however, in that the pressure of the feed water flowing into the filtering unit 210 should be much higher.

Second, the fine bubbles are produced when the air compressed with high pressure, i.e., the air dissolved in water under high pressure, comes out to the atmosphere of normal pressure. Thus, if supplied to the feed water in the filtering unit 210, such fine bubbles might be dissolved again in the feed water of high pressure and disappear. That is, if supplied to the feed water in the filtering unit 210 and thus situated under high pressure, the fine bubbles are highly likely to be dissolved in the feed water again. As a result, when the aeration cleaning with fine bubbles is applied to the pressurized-type filtration, there might be a disadvantage that satisfactory aeration effect cannot be expected.

Hereinafter, the filtration system according to the third embodiment of the present invention which can obviate and overcome the drawbacks of the filtration system 200 according to the second embodiment of the present invention will be described in detail with reference to FIG. 3.

Figure 3:
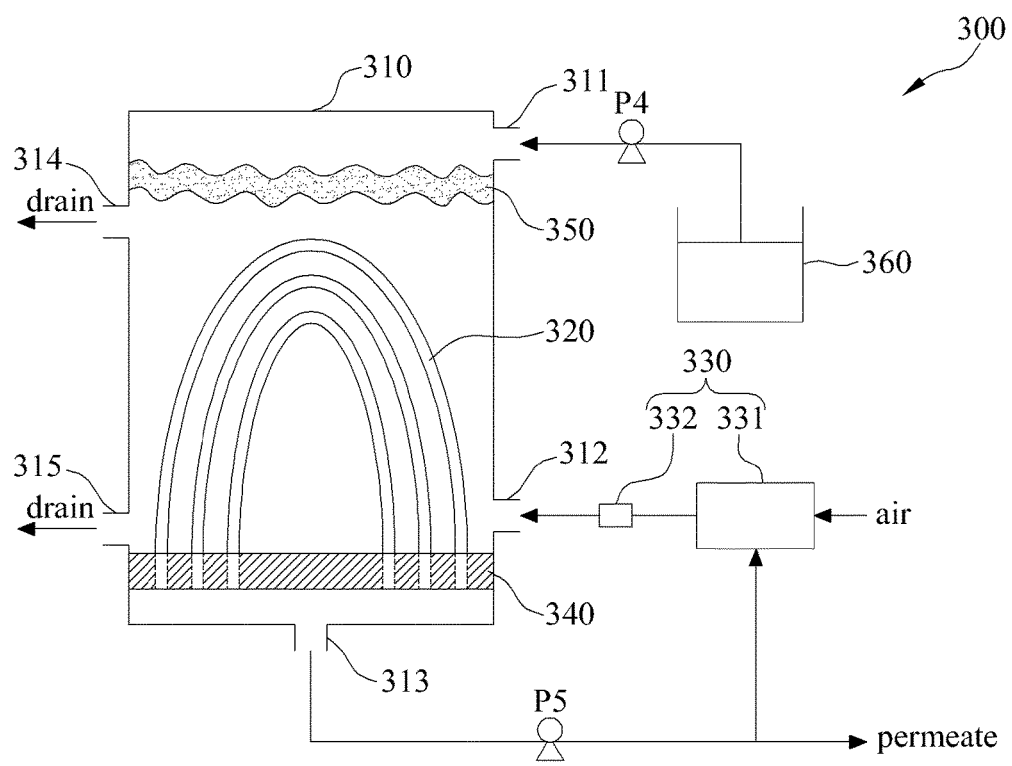
FIG. 3 schematically shows a system for filtration according to the third embodiment of the present invention.

FIG. 3 schematically shows the filtration system according to the third embodiment of the present invention.

As illustrated in FIG. 3, the filtration system 300 according to the third embodiment of the present invention comprises a module case 310 as a filtering unit for providing a space for a feed water to be treated. The module case 310 comprises a feed water inlet port 311, a fine bubble inlet port 312, and a filtrate outlet port 313. The module case 310 may further comprise the first outlet port 314 for discharging the contaminants rising toward the surface of the feed water, and the second outlet port 315 for discharging the condensed water produced as the filtration is performed.

There exists a fixing member 340 in the module case 310. The fixing member 340 physically blocks the filtrate outlet port 313 from the space for the feed water so that the feed water in the module case 310 is prevented from being discharged from the module case 310 through the filtrate outlet port 313.

The filtration system 300 comprises a hollow fiber membrane 320 in the module case 310. Both ends of the hollow fiber membrane 320 are potted in the fixing member 340. That is, the hollow fiber membrane 320 is fixed while existing in the module case 310. The both ends of the hollow fiber membrane 320 are open so that the hollow fiber membrane 320 can be in fluid communication with the filtrate outlet port 313.

As illustrated in FIG. 3, since the fixing member 340 is disposed at the lower part of the module case 310 and the both ends of the hollow fiber membrane 320 are potted in the fixing member 340, the entire hollow fiber membrane 320 can be maintained in the feed water without being exposed to air even when an air layer is formed at the upper part of the module case 310 as the fine bubbles disappear during the filtration. Accordingly, the obstruction of the filtration due to the inflow of the air into the hollow fiber membrane 320 can be prevented.

The filtration system 300 according to the third embodiment of the present invention further comprises a pump P5 for applying a negative pressure to a lumen of the hollow fiber membrane 320 through the filtrate outlet port 313. As the negative pressure is provided by the pump P5, only fluid permeates the hollow fiber membrane 320 and the solid components such as impurities and sludge are separated therefrom. The filtrate which comes into the lumen of the hollow fiber membrane 320 is discharged from the module case 310 through the filtrate outlet port 313.

The filtration system 300 further comprises a feed water supplier for providing the feed water to be treated into the module case 310 through the feed water inlet port 311, and a fine bubble supplier 330 for providing the fine bubbles into the feed water in the module case 310 through the fine bubble inlet port 312.

The feed water supplier may comprise a feed water tank 360 for storing the feed water and a pump P4 for conveying the feed water from the feed water tank 360 to the module case 310. The pump P4 only provides the pressure of such level as necessary to convey the feed water to the module case 310.

That is, contrary to the pressurized-type filtration system in which feed water of relatively high pressure is supplied to a filtering unit, the pressure of the feed water supplied into the module case 310 is not that high in the filtration system 300 of the third embodiment of the present invention, which comprises the pump P5 for providing the hollow fiber membrane 320 with negative pressure instead. As the negative pressure is supplied, the pressure difference between the inside and outside of the hollow fiber membrane 320 occurs so that the filtration process is carried out. Consequently, the probability that the fine bubbles will dissolve in the feed water can be minimized since the fine bubbles are supplied to the feed water which is not that highly pressurized, and thus the fine bubbles supplied for aeration cleaning of the hollow fiber membrane 320 in the module case 310 can be exploited to the maximum.

The fine bubble supplier 330 may comprise an air dissolving unit 331 which receives an air and a portion of the filtrate produced by the hollow fiber membrane 320 and dissolves the air in the filtrate to produce an air-dissolved filtrate, and a nozzle 332 which receives the air-dissolved filtrate from the air dissolving unit 331 and ejects it to produce the fine bubbles. As illustrated in FIG. 3, the nozzle 332 may be disposed outside the module case 310 and the fine bubbles may be supplied to the feed water in the module case 310 through a separate pipe.

Hereinafter, the filtration process of the filtration system 300 according to the third embodiment of the present invention will be described in detail.

First, the feed water in the feed water tank 360 is conveyed into the module case 310 by the pump P4.

The pump P5 supplies the negative pressure into the lumen of the hollow fiber membrane 320 so that only the fluid of the feed water can penetrate the hollow fiber membrane 320 and the impurities in the feed water can be separated therefrom.

A portion of the filtrate produced through the filtration process flows toward the air dissolving unit 331 and the rest of the filtrate is discharged from the module case 310 through the filtrate outlet port 313. The air dissolving unit 331 receives an air through another path, dissolves the air in the filtrate to produce an air-dissolved filtrate, and then supplies it to the nozzle 332.

The fine bubbles produced by the nozzle 332 are provided into the module case 310 through a pipe (now shown) and the fine bubble inlet port 312. The fine bubbles may be microbubbles, nanobubbles, or the mixture thereof.

When the fine bubbles rise within the feed water slowly, a portion thereof adhere to the surface of the hollow fiber membrane thereby preventing other contaminants from adhering thereto. The sterilization effect can also be expected since, as time goes by, the fine bubbles, particularly nanobubbles, burst causing the rapid increase of the temperature. The cleaning and sterilization effects of the fine bubbles as described above make it possible to keep the filtration capacity of the hollow fiber membrane 320 for longer time.

Due to the attraction force, the impurities in the feed water adhere to a portion of the fine bubbles rising slowly within the feed water, and rise toward the water surface together with them. As a result, there is formed a dynamic filtration layer 350 comprising the fine bubbles and a variety of particulate contaminants on the surface of the feed water (near the upper part of the module case 310) in the filtering unit 310.

As time goes by, new fine bubbles and contaminants are added to the dynamic filtration layer 350, and the existing fine bubbles disappear at the same time to form an air layer at the upper part of the module case 310.

Optionally, the amount of the feed water supplied from the feed water supplier can be controlled in such a way that the position of the dynamic filtration layer 350 is kept lower than the feed water inlet port 311 of the module case 310 during the filtration process. In this case, the air layer always exists at the upper part of the module case 310 regardless of the dissipation of the fine bubbles in the dynamic filtration layer 350. Further, since the feed water flowing through the feed water inlet port passes through the dynamic filtration layer 350 firstly, the pretreatment of the feed water by means of the dynamic filtration layer 350 can be performed. That is, both the pretreatment with the dynamic filtration layer 350 and the filtration with the hollow fiber membrane 320 can be carried out in a single module case 310.

The systems and methods for filtration according to the first to third embodiments of the present invention as described above are summarized as below.

The filtration method of the present invention comprises pretreating a feed water to be treated and filtering the pretreated feed water with a filtering membrane, wherein the pretreating and filtering are performed in a single filtering unit.

The pretreating the feed water may comprise forming a dynamic filtration layer on the surface of the feed water to be treated in the filtering unit and supplying the feed water to be treated into the filtering unit through the dynamic filtration layer.

The forming the dynamic filtration layer may comprise supplying fine bubbles to the feed water. The supplying the fine bubbles may comprise dissolving an air in a filtrate produced through the filtering step and ejecting the air-dissolved filtrate to produce the fine bubbles.

The invention claimed is:

1. A method for filtration comprising:
   (a) producing an air-dissolved filtrate in an air dissolving unit by dissolving an air in a filtrate by applying pressure;
   (b) ejecting the air-dissolved filtrate into a water in a filtering unit by a nozzle, to form a dynamic filtration layer at a surface of the water, the dynamic filtration layer including microbubbles having a diameter of 1 to 100 µm and nanobubbles having a diameter less than 1 µm, and the nozzle is connected to the air dissolving unit;
   (c) supplying a feed water into the filtering unit through the dynamic filtration layer to produce a pre-treated water; and
   (d) filtering the pre-treated feed water with a filtering membrane in the filtering unit to give a filtered water, wherein the filtrate of (a) is a portion of the filtered water obtained in (d).

2. A system for filtration comprising:
   a filtering unit providing a space for a feed water to be treated;
   a filtering membrane disposed in the space to treat the feed water;
   an air dissolving unit configured to receive a portion of a filtrate from the filtering membrane and an air, and to apply pressure to dissolve the air in the portion of the filtrate to give an air-dissolved filtrate;
   a nozzle connected to the air dissolving unit and configured to eject the air-dissolved filtrate from the air dissolving unit to supply fine bubbles into the feed water in the filtering unit in a way that the supplied fine bubbles rise in the feed water, wherein the fine bubbles touch the filtering membrane when rising within the feed water; wherein the fine bubbles form a dynamic filtration layer near the water surface in the filtering unit; and wherein the fine bubbles include microbubbles having a diameter of 1 to 100 µm and nanobubbles having a diameter less than 1 µm;
   a feed water supplier providing the filtering unit with the feed water through the dynamic filtration layer.

3. A system for filtration comprising:
   a module case comprising a feed water inlet port, a fine bubble inlet port, and a filtrate outlet port;
   a feed water supplier providing a feed water to be treated into the module case through the feed water inlet port;
   a fine bubble supplier providing fine bubbles into the feed water in the module case through the fine bubble inlet port wherein the fine bubbles include microbubbles having a diameter of 1 to 100 µm and nanobubbles having a diameter less than 1 µm;
   a fixing member in the module case, the fixing member physically blocking the filtrate outlet port from a space for the feed water so that the feed water is prevented from discharging from the module case through the filtrate outlet port;
   a hollow fiber membrane in the module case, wherein first and second ends of the hollow fiber membrane, which are opposite to each other, are potted in the fixing member and are open so that the hollow fiber membrane is in fluid communication with the filtrate outlet port; and
   a pump for applying a negative pressure to a lumen of the hollow fiber membrane through the filtrate outlet port, wherein the fine bubble supplier comprises: an air dissolving unit configured to receive a portion of a filtrate from the hollow fiber membrane and an air, and to apply pressure to dissolve the air in the portion of the filtrate to produce an air-dissolved filtrate; and a nozzle connected to the air dissolving unit and configured to eject the air-dissolved filtrate from the air dissolving unit to supply the fine bubbles into the feed water in a way the supplied fine bubbles rise in the feed water.

* * * * *